(12) United States Patent
Kuroita et al.

(10) Patent No.: US 7,854,473 B2
(45) Date of Patent: Dec. 21, 2010

(54) VEHICLE FRONT STRUCTURE

(75) Inventors: Hideyuki Kuroita, Wako (JP);
Yoshinori Fukushi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 242 days.

(21) Appl. No.: 12/206,102

(22) Filed: Sep. 8, 2008

(65) Prior Publication Data

US 2009/0066116 A1  Mar. 12, 2009

(30) Foreign Application Priority Data

Sep. 10, 2007 (JP) ............................. 2007-233860
Sep. 11, 2007 (JP) ............................. 2007-235063
Sep. 11, 2007 (JP) ............................. 2007-235791

(51) Int. Cl.
*B60K 37/00* (2006.01)

(52) U.S. Cl. ................................. 296/203.02; 296/192

(58) Field of Classification Search ............ 296/203.02, 296/192, 70; 180/90; 224/483
See application file for complete search history.

(56) References Cited

U.S. PATENT DOCUMENTS

| | | | | |
|---|---|---|---|---|
| 3,719,245 | A * | 3/1973 | Wilfert | 180/90 |
| 3,843,194 | A * | 10/1974 | Yamada | 296/192 |
| 4,146,263 | A * | 3/1979 | Watari | 296/96.21 |
| 4,286,506 | A * | 9/1981 | Yanagida | 454/154 |
| 4,717,198 | A * | 1/1988 | Komatsu | 296/192 |
| 4,718,712 | A * | 1/1988 | Nakatani | 296/192 |
| 4,721,032 | A * | 1/1988 | Sakamoto | 454/146 |
| 4,869,546 | A * | 9/1989 | Sato | 296/192 |
| 4,950,024 | A * | 8/1990 | Watari et al. | 296/192 |
| 6,869,134 | B2 * | 3/2005 | Kato et al. | 296/192 |
| 6,921,126 | B2 * | 7/2005 | Suh et al. | 296/192 |
| 7,004,534 | B2 * | 2/2006 | Yoshii et al. | 296/192 |
| 7,316,448 | B2 * | 1/2008 | Koyama et al. | 296/192 |
| 7,357,446 | B2 * | 4/2008 | Sakai et al. | 296/192 |
| 7,390,047 | B2 * | 6/2008 | Hanakawa et al. | 296/70 |
| 7,404,596 | B2 * | 7/2008 | Miyata et al. | 296/203.02 |
| 7,540,557 | B2 * | 6/2009 | Shimura | 296/192 |
| 7,552,964 | B2 * | 6/2009 | Saito | 296/192 |
| 7,703,805 | B2 * | 4/2010 | Sasaki et al. | 280/784 |

(Continued)

FOREIGN PATENT DOCUMENTS

DE  10 2005 033 030  1/2007

(Continued)

*Primary Examiner*—Kiran B. Patel
(74) *Attorney, Agent, or Firm*—Rankin, Hill & Clark LLP

(57) ABSTRACT

A vehicle front structure includes: a lower dashboard; an upper dashboard frontward extending from an upper end portion of the lower dashboard, both the lower and upper dashboards partially defining an engine compartment; damper housings disposed on a right side and a left side of the engine compartment, with right and left ends of the upper dashboard being joined to the respective damper housings; and a stiffener extending in a vehicle width direction which is fixed to an upper portion of the upper dashboard, wherein the stiffener is integrally formed of: a first transversal element connecting an upper portion of the right damper housing and an upper portion of the left damper housing; a second transversal element extending in the vehicle width direction and positioned rearward relative to the first transversal element; a plurality of longitudinal elements each connecting the first transversal element and the second transversal element.

3 Claims, 14 Drawing Sheets

U.S. PATENT DOCUMENTS

| | | |
|---|---|---|
| 2005/0179285 A1* | 8/2005 | Nakajima et al. ............ 296/192 |
| 2009/0146459 A1* | 6/2009 | Watanabe et al. ............ 296/192 |
| 2009/0261621 A1* | 10/2009 | Usuda ........................ 296/192 |

FOREIGN PATENT DOCUMENTS

| | | |
|---|---|---|
| JP | 61-75377 | 5/1986 |
| JP | 05-185907 | 7/1993 |
| JP | 11-115810 | 4/1999 |
| JP | 2001-080543 | 3/2001 |
| JP | 2004-217144 | 8/2004 |
| JP | 2006-213291 | 8/2006 |
| JP | 2006-327449 | 12/2006 |
| JP | 2007-045263 | 2/2007 |
| JP | 2007-90920 | 4/2007 |

* cited by examiner

VEHICLE FRONT STRUCTURE

CROSS-REFERENCE TO RELATED APPLICATIONS

This application claims the foreign priority benefit under Title 35, United States Code, section 119(a)-(d), of Japanese Patent Applications No. 2007-233860 filed on Sep. 10, 2007, No. 2007-235063 filed on September 11, and No. 2007-235791 filed on September 11, in the Japan Patent Office, the disclosures of which are herein incorporated by reference in their entirety.

BACKGROUND OF THE INVENTION

1. Field of the Invention

The present invention relates to a vehicle front structure including a large-size upper dashboard which frontward extends from an upper end portion of a lower dashboard separating an engine compartment and a vehicle compartment.

2. Description of the Related Art

JP2006-213291A (paragraphs 0024-0025, FIGS. 1 and 3) discloses a vehicle front structure including an upper dashboard separating an engine compartment and a vehicle compartment, and right and left damper housings for holding corresponding right and left dampers. In such a vehicle front structure, the upper dashboard is connected to the right and left damper housings at corresponding end portions of the upper dashboard, and drain grooves are formed in a front portion and a rear portion of the upper dashboard, each extending in a longitudinal direction of the upper dashboard (vehicle width direction) and having a U-shaped cross section in a front-rear direction. With this structure, strength of the upper dashboard is enhanced, which in turn enhances strength of the right and left damper housings.

Along with the recent improvements in performances of automobiles, the number of devices to be mounted in the engine compartment has been increasing. For example, it is demanded that brake-parts or the like be mounted in the vicinity of the damper housing. Especially in a hybrid car, in addition to the conventional engine, many electrical equipment parts or the like associated with a motor are expected to be held in the engine compartment. Therefore, it has been highly demanded to utilize a space under the upper dashboard.

Further, in order to improve body rigidity of the vehicle, especially rigidity around the damper housing, proposals have been made in which a stiffener is fixedly installed to an upper face of the upper dashboard, in such a manner that the stiffener connects the right and left damper housings.

However, in the vehicle front structure described in the above-mentioned patent document, the end portions of the upper dashboard are joined to the respective damper housings, leading to poor utilization of a space under the upper dashboard, such as for mounting brake-parts or the like.

In addition, since the strength of the upper dashboard is not satisfactory, it has been conventionally avoided to suspend vehicle parts from the upper dashboard. In the upper dashboard described in the above-mentioned patent document, rigidity (section modulus) is reinforced with the formation of the drain groove having a U-shaped cross section. Even so, a weight that can be suspended from the upper dashboard is still small, and rigidity reinforcement of the upper dashboard has been further desired.

In the case of a large sized upper dashboard, low-frequency noise (also referred to as drumming noise) may be generated due to resonance with vehicle vibration, and suppression thereof is demanded.

Furthermore, when the stiffener is fixedly installed to the upper face of the upper dashboard so as to connect the right and left damper housings, at least three steal plates (four steal plates when a damper flange is included) should be welded in a overlapped state on an upper face of the damper housing, making it difficult to perform secure welding. As a result, load cannot be efficiently transferred from the damper housing to the stiffener, and the damper housing may not be efficiently reinforced.

Therefore, it would be desirable to provide a vehicle front structure in which rigidity from the upper dashboard and the damper housing is surely improved, and thus noise is surely reduced, and at the same time, a space under the upper dashboard is efficiently used for mounting parts (for example, a structure that makes it possible to fixedly suspend the parts and to allow access for maintenance).

SUMMARY OF THE INVENTION

In one aspect of the present invention, there is provided a vehicle front structure including: a lower dashboard; an upper dashboard frontward extending from an upper end portion of the lower dashboard, both the lower dashboard and the upper dashboard partially defining an engine compartment; damper housings disposed on a right side and a left side of the engine compartment, with right and left ends of the upper dashboard being joined to the respective damper housings; and a stiffener extending in a vehicle width direction which is fixed to an upper portion of the upper dashboard, wherein the stiffener is integrally formed of: a first transversal element connecting an upper portion of the right damper housing and an upper portion of the left damper housing; a second transversal element extending in the vehicle width direction and positioned rearward relative to the first transversal element; a plurality of longitudinal elements each connecting the first transversal element and the second transversal element.

In another aspect of the present invention, there is provided a vehicle front structure as set forth above, wherein a cutout portion is formed in the upper dashboard for exposing the damper housing, and an end portion of the stiffener is welded to the damper housing exposed from the cutout portion.

In still another aspect of the present invention, there is provided a vehicle front structure as set forth above, wherein the upper dashboard has at least one cutout portion on at least one of a right damper housing side and a left damper housing side, the structure further comprises a load transfer member configured to connect the first transversal element and an upper portion of the damper housing at the cutout portion.

BRIEF DESCRIPTION OF THE DRAWINGS

The various aspects, other advantages and further features of the present invention will become more apparent by describing in detail illustrative, non-limiting embodiments thereof with reference to the accompanying drawings.

DETAILED DESCRIPTION OF PREFERRED EMBODIMENTS

Figure 1:
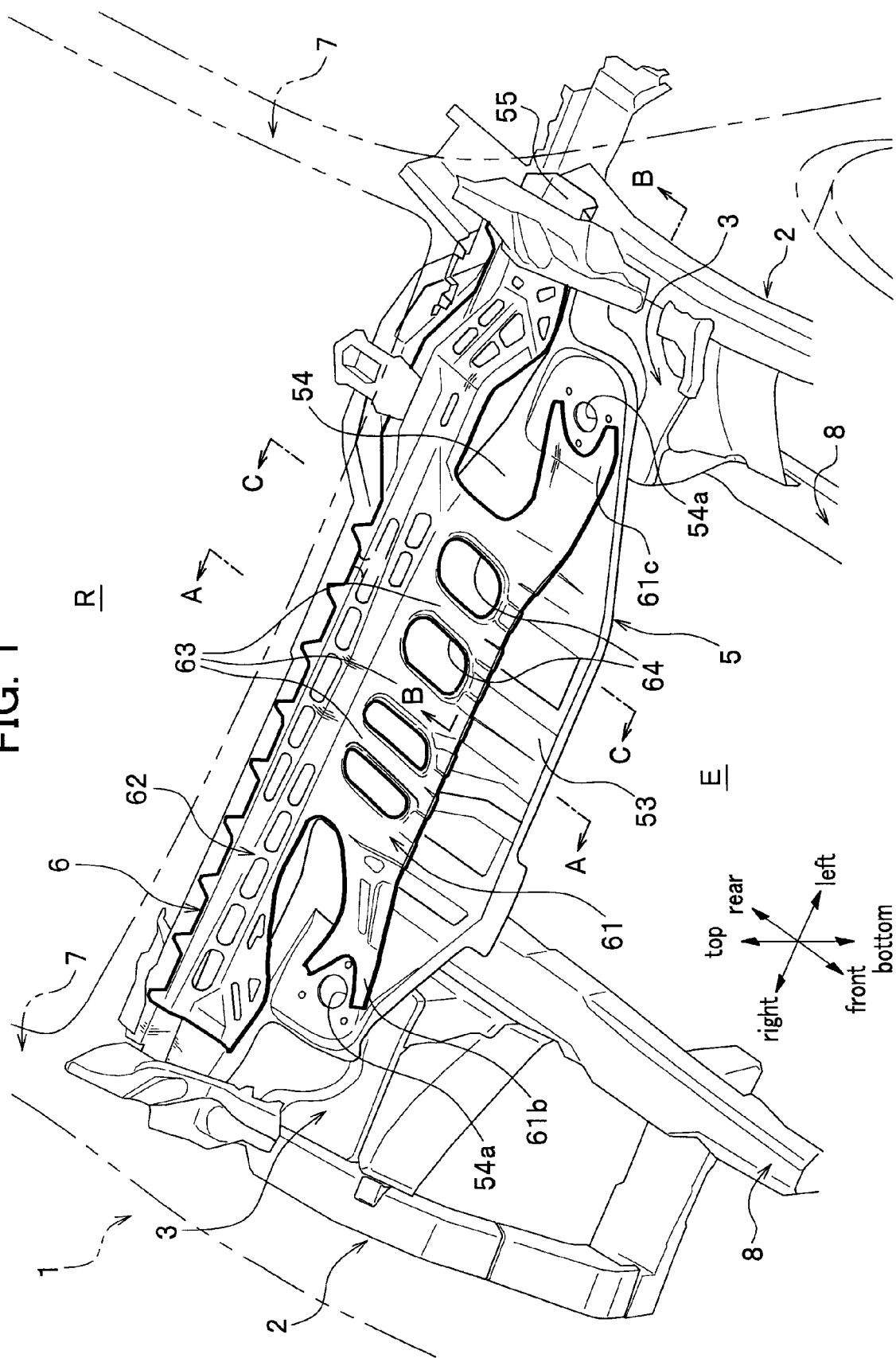
FIG. 1 is a perspective view showing a front side of a vehicle body having a front structure according to an embodiment of the present invention.

An embodiment of the present invention will be described in detail below with reference to the accompanying drawings. In the following description, components which are the same are designated with the same reference characters, and thus a duplicate description is omitted. Also in the following description, and terms "front", "rear", "upper (or top)", "lower (or bottom)", "right" and "left" mean respective sides relative to the vehicle body when seen from a driver/passenger seated in the vehicle.

As shown in FIG. 1, a vehicle 1 has upper members 2,2 extending in a longitudinal (front-rear) direction of the vehicle 1, on both right and left sides of a front portion of the vehicle 1. On a rear end portion of each of the upper members 2,2, a damper housings 3 configured to support a damper D (see FIG. 3) is provided. On a rear end of an engine compartment E of the vehicle 1, a lower dashboard 4 separating the engine compartment E and a vehicle compartment R (see FIG. 2) is provided. On an upper end portion of the lower dashboard 4, an upper dashboard 5 is provided. The upper dashboard 5 is a plate-like member extending frontward relative to the vehicle 1, from the upper end portion of the lower dashboard 4, and right and left end portions (both end portions) of the upper dashboard 5 are joined to the respective upper portions of the damper housings 3,3 and the respective upper members 2,2. On an upper portion of the upper dashboard 5, a stiffener 6 configured to reinforce the upper dashboard 5 is fixedly installed. These members are joined to each other by, for example, spot welding and fillet welding.

In the present embodiment, to the rear end portions of the upper members 2,2, respective front pillars 7,7 are joined. At positions inward and diagonally below the upper members 2,2 when seen from the front, there are disposed front side frames 8,8 extending in a front-rear direction of the vehicle 1. The upper end portions of the damper housings 3,3 are joined to the respective upper members 2,2, and the lower end portions are joined to the respective front side frames 8,8. The damper D (see FIG. 3) supported by the damper housings 3,3 is a device configured to attenuate vibration of tires. To the damper D, a coil spring (not shown) configured to absorb impact is installed. To lower portions of the damper D and coil spring, unspring members (not shown), such as tires, are connected. Above the upper dashboard 5, a windshield support 9 (see FIG. 2) is provided so as to cover the upper dashboard 5 and the stiffener 6. The windshield support 9 supports a lower end portion of a windshield W.

Figure 2:
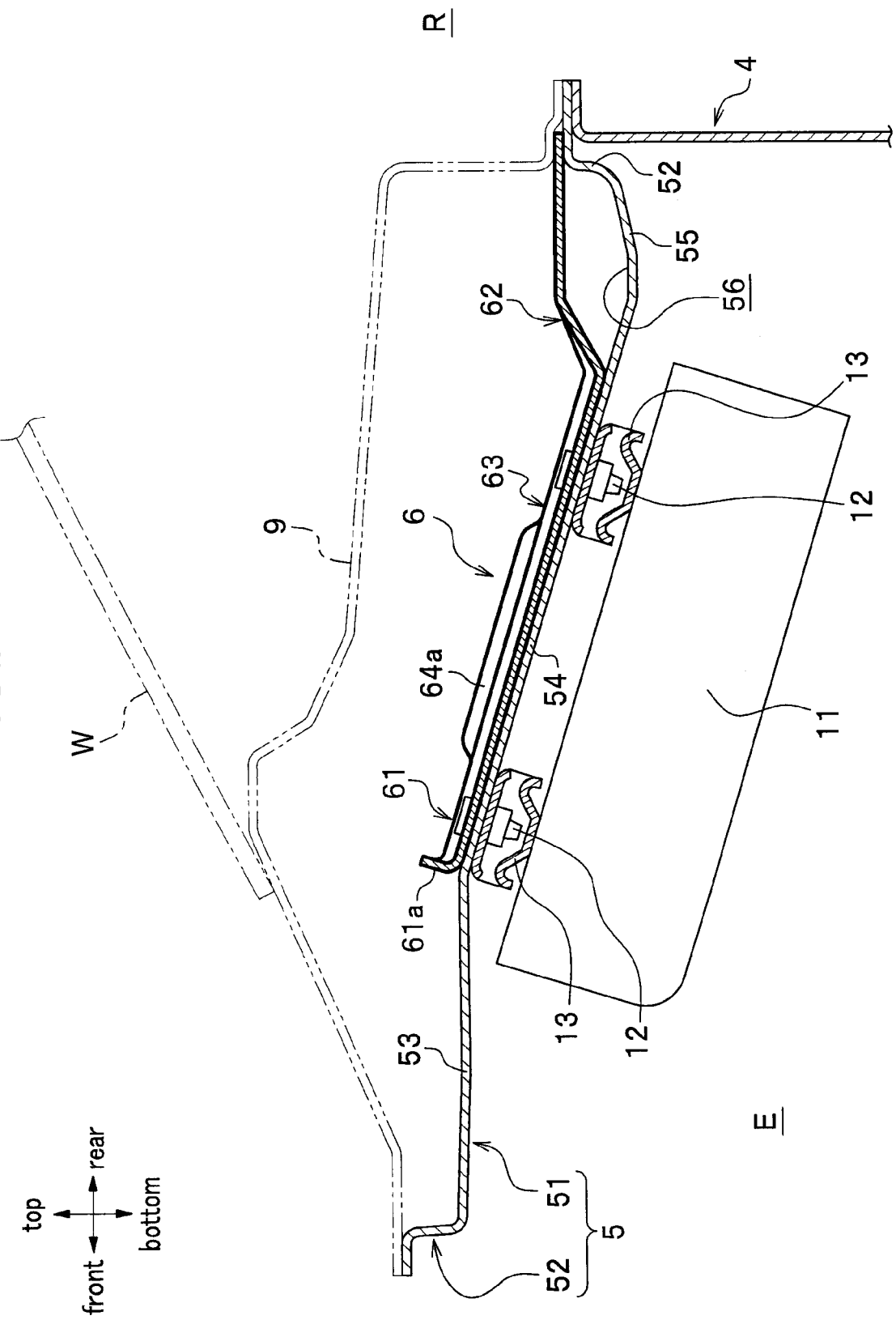
FIG. 2 is a cross section taken along a line A-A in FIG. 1.

Referring to FIG. 2 (see FIG. 1 where appropriate), the upper dashboard 5 is a plate-like member made of steel, extending frontward (relative to the vehicle) from the upper end portion of the lower dashboard 4. The upper dashboard 5 is formed of a bottom wall 51, and a peripheral wall 52 that surrounds the bottom wall 51.

The bottom wall 51 includes: a horizontal portion 53 formed on a front end side, which is approximate horizontal; an inclined portion 54 extending from a rear end of the horizontal portion 53 and downward inclining towards the rear; and a drain portion 55 extending rearward from a rear end of the inclined portion 54. In a rear edge portion of the upper dashboard 5, a drain groove 56 having a U-shaped cross section and extending in a vehicle width direction is formed by the drain portion 55, the inclined portion 54 and the peripheral wall 52. On each of right and left sides of the inclined portion 54, a through-hole 54a (see FIG. 1) for exposing a head of the damper D (see FIG. 3) is formed. The upper dashboard 5 is formed by, for example, press molding.

Referring to FIGS. 1 and 2, the stiffener 6 is a reinforcing member made of steel extending in the vehicle width direction and fixedly installed to the upper portion of the upper dashboard 5. The stiffener 6 includes: a first transversal element 61 configured to connect upper portions of the right and left damper housings 3,3; a second transversal element 62 extending in the vehicle width direction and positioned rearward relative to the first transversal element 61; and a plurality of longitudinal elements 63,63 . . . , each connecting the first transversal element 61 and the second transversal element 62. The stiffener 6 is integrally formed by, for example, press molding of a steel plate using a specific die.

The first transversal element 61 extends in the vehicle width direction on an upper face of the inclined portion 54 of the upper dashboard 5. In a front end portion of the first transversal element 61, a flange 61a is formed by bending the first transversal element 61, in such a manner that the flange 61a is standing vertically relative to the bottom wall 51. With this flange 61a, flexural rigidity of the first transversal element 61 in the vehicle width direction is reinforced. A right endportion 61b and a left endportion 61c of the first transversal element 61 are fixed to the respective upper portions of the damper housings 3,3 through the upper dashboard 5. Each of the end portions 61b, 61c of the first transversal element 61 is in a shape of Y as planar view, and mounted on the upper dashboard 5 without being brought into contact with a head or a fixing bolt of the damper D (see FIG. 3) exposed from the through-hole 54a.

The second transversal element 62 extends in the vehicle width direction so as to cover the drain portion 55 of the upper dashboard 5 from above. The second transversal element 62 extends from rear end portions of the longitudinal elements 63 and inclines upward toward the rear so as to be away from the upper dashboard 5, but ends horizontally at the same level as the level of an upper portion of the peripheral wall 52 locating at a rear portion of the upper dashboard 5. A rear end portion of the second transversal element 62 is fixed while being sandwiched between the upper portion of the peripheral wall 52 on a rear side and a rear end portion of the windshield support 9. In other words, the drain groove 56 having a U-shaped cross section and the second transversal element 62 together forms a closed cross section. With this configuration, rigidity of the drain groove 56 is reinforced. It should be noted that in the second transversal element 62, a plurality of holes are formed for reducing the weight of the member (see FIG. 1).

A plurality of the longitudinal elements 63 extending in the front-rear direction are formed contiguously to a rear end portion of the first transversal element 61 and a front end portion of the second transversal element 62. Between two adjacent longitudinal elements 63, a through-hole 64 in a shape of an approximate rectangle with rounded corners as a planar view is formed. Around each of the through-holes 64, a flange 64a standing upright is provided. With respect to the flanges 64a, portions extending in the front-rear direction reinforce flexural rigidity of the longitudinal elements 63 in the front-rear direction. The longitudinal elements 63 are joined to an upper face of the upper dashboard 5 by, for example, spot welding.

As shown in FIG. 2, under the upper dashboard 5, parts with relatively heavy weights (hereinafter, referred to as "heavy load 11"), such as electrical equipment parts of a hybrid device, are installed. The heavy load 11 is fixedly suspended from the upper dashboard 5 and the stiffener 6, through a fixing piece 12 and a bracket 13. Examples of the fixing piece 12 include bolt and nut.

It should be noted that parts to be fixedly suspended from the upper dashboard 5 are not limited to electrical equipment parts of a hybrid device, and may be appropriately selected from parts or devices to be installed in the engine compartment E.

Figure 3:
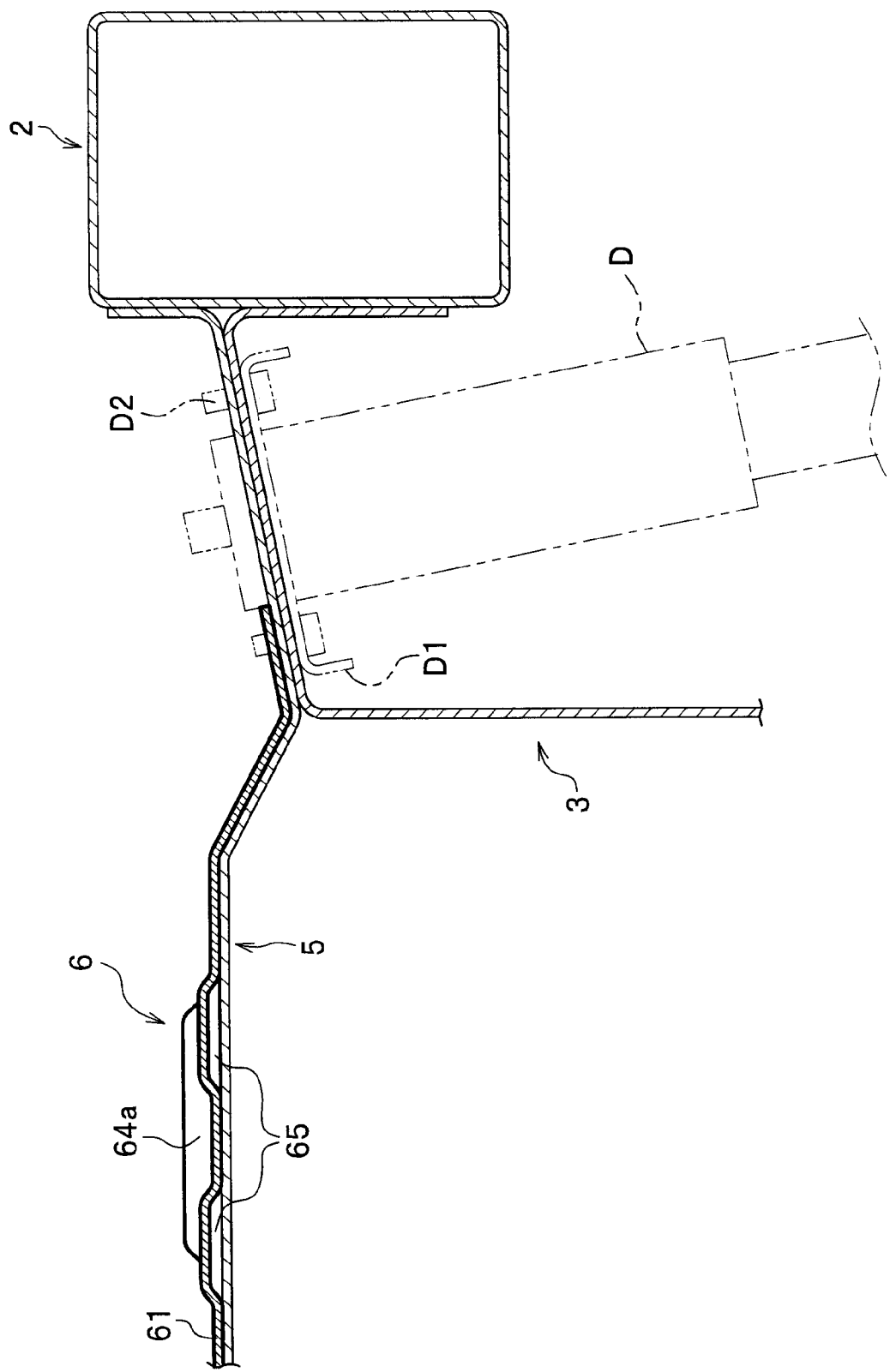
FIG. 3 is a cross section taken along a line B-B in FIG. 1.
Figure 4:
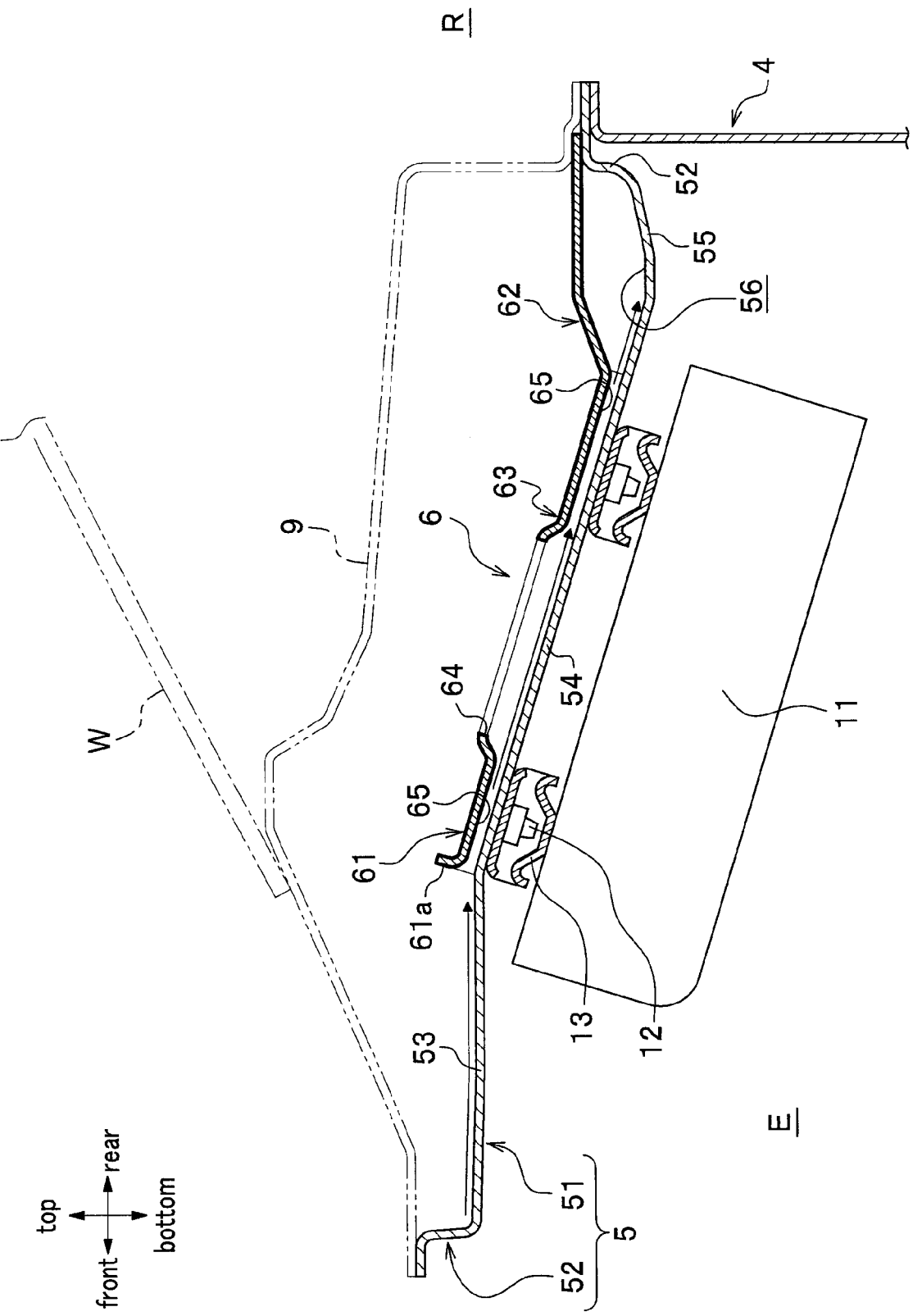
FIG. 4 is a cross section taken along a line C-C in FIG. 1.

As shown in FIGS. 3 and 4, in a lower face of the stiffener 6, a plurality of recessed grooves 65 each being recessed upward and extending in the front-rear direction are formed in some intervals in the vehicle width direction. The recessed grooves 65 are formed in the first transversal element 61 and the second transversal element 62, at front and rear positions relative to the through-hole 64. The recessed groove 65 formed in the first transversal element 61 and another recessed groove 65 formed in the second transversal element 62 communicate with each other through the through-hole 64. In other words, between the upper face of the upper dashboard 5 and the lower face of the stiffener 6, communicating gaps in the front-rear direction are formed by the recessed grooves 65,65. The gap serves as a fluid passage configured to lead rain water or the like attached to the upper face of the upper dashboard 5 to the drain groove 56 formed in the rear edge portion of the upper dashboard 5 (see FIG. 4). The recessed groove 65 is formed by, for example, bending (or press-molding) a steel plate forming the stiffener 6, in such a manner that an upper face has a projection and the lower face has a recess.

It should be noted that, as shown in FIG. 3, the damper D is disposed in the damper housing 3. On an upper portion of the damper D, a bracket D1 for damper installation is provided. The damper D is secured by engaging a nut with a bolt D2 that penetrates the bracket D1, the damper housing 3 and the upper dashboard 5.

Next, effects of the vehicle front structure according to the present embodiment will be described.

According to the present embodiment, rigidity of the upper dashboard 5 in the width direction can be enhanced by the first transversal element 61 and the second transversal element 62. At the same time, rigidity of the upper dashboard 5 in the front-rear direction can be enhanced by a plurality of the longitudinal elements 63. As a result, rigidity of the upper dashboard 5 as a whole can be enhanced, and thus a heavy weight part, which may otherwise cause deformation of the conventional upper dashboard, can be fixed to the upper dashboard 5 on the lower face of the upper dashboard 5.

Especially, a beam structure is formed by the first transversal element 61 that bridges the right and left damper housings 3,3, and at the same time the flange 61a is formed in the front end portion of the first transversal element 61, rigidity is improved and the heavy load 11 can be fixed.

In addition, a closed cross section is formed by the second transversal element 62 and the drain groove 56, leading to further improved rigidity as compared with a drain groove alone (i.e., in a case of an open cross section). Therefore, when the parts that should be installed in the engine compartment are suspended from the upper dashboard 5, deformation amount of the upper dashboard 5 becomes small, and it becomes possible to suspend heavier part than the conventional parts.

Further, since rigidity and strength of the upper dashboard 5 are enhanced by the stiffener 6, the upper dashboard 5 hardly resonates with low-frequency vibration and drumming noise is reduced. Especially, by connecting the stiffener 6 having a plurality of the longitudinal elements 63 with the upper dashboard 5, rigidity of the upper dashboard 5 in the front-rear direction is enhanced, and noise is reduced.

Moreover, a space below the upper dashboard 5, which conventionally has been a dead space, can be utilized, and parts installed in the engine compartment can be fixedly suspended. By fixing the heavy load 11 below the upper dashboard 5, the supporting member (the upper dashboard 5 and the windshield support 9) for supporting the lower portion of the windshield W becomes heavier, to thereby prevent low-frequency resonance and to reduce drumming noise.

Furthermore, since the recessed grooves 65 are formed in the lower face of the stiffener 6, rain water or the like attached to the upper face of the upper dashboard 5 can be suitably lead to the drain groove 56 formed in the rear edge portion of the upper dashboard 5. In addition, since smooth water flow is realized without being interrupted, the upper dashboard 5 and the stiffener 6 hardly rust, resulting in enhancement in rust prevention.

The embodiment of the present invention has been described above. However, the present invention is not limited to the above embodiment, and it is a matter of course that the above embodiment may be properly modified.

For example, in the present embodiment, the right and left end portions of the upper dashboard 5 are directly joined to the respective upper faces of the damper housings 3,3, but they may be indirectly joined to the respective upper faces of the damper housings 3,3, through connecting members (not shown), such as gusset.

In addition, in the present embodiment, the heavy load 11 is fixedly suspended from the upper dashboard 5 and the stiffener 6 using bolt and nut. However, a means for fixing the heavy load 11 is not limited to this embodiment, and for example, the bracket 13 may be fixed to a lower face of the upper dashboard 5 by welding or the like, and the heavy load 11 may be fixedly suspended from the bracket 13.

Further, for example, a groove (bead) for collecting rain water to the recessed groove 65 may be formed in an upper face of the horizontal portion 53.

<First Modified Version>

A first modified version according to the present invention will be described in detail with reference to FIGS. 5 to 9. In the following descriptions, components which are the same as those illustrated in the embodiment above are designated with the same reference characters, and thus a duplicate description is omitted. Components which correspond (equivalent or similar) to those illustrated in the embodiment above are designated with the same reference characters, along with the character "A", and detailed description is made only when necessary.

Figure 5:
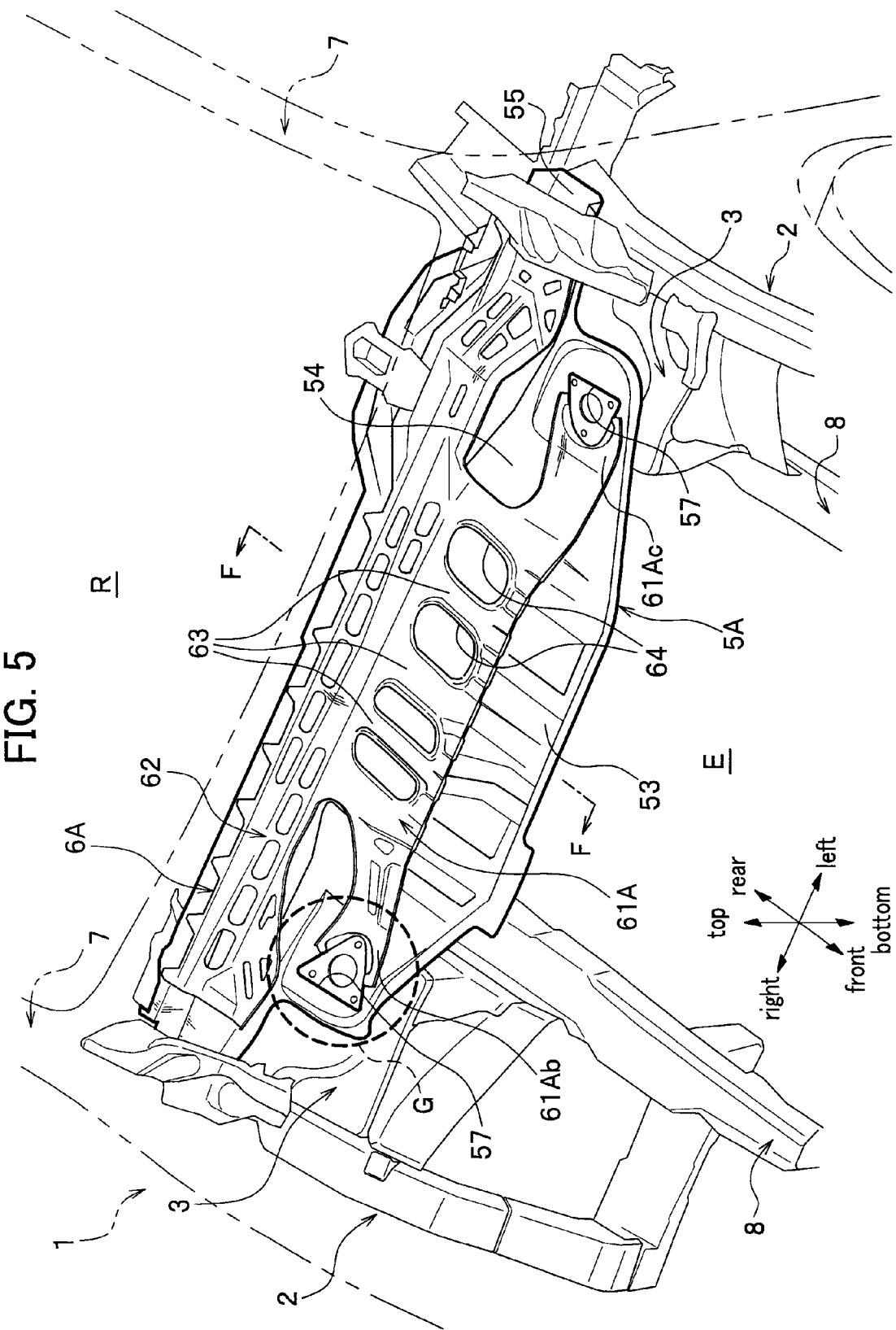
FIG. 5 is a perspective view showing a front side of a vehicle body having a front structure according to a first modified version of an embodiment of the present invention.
Figure 6:
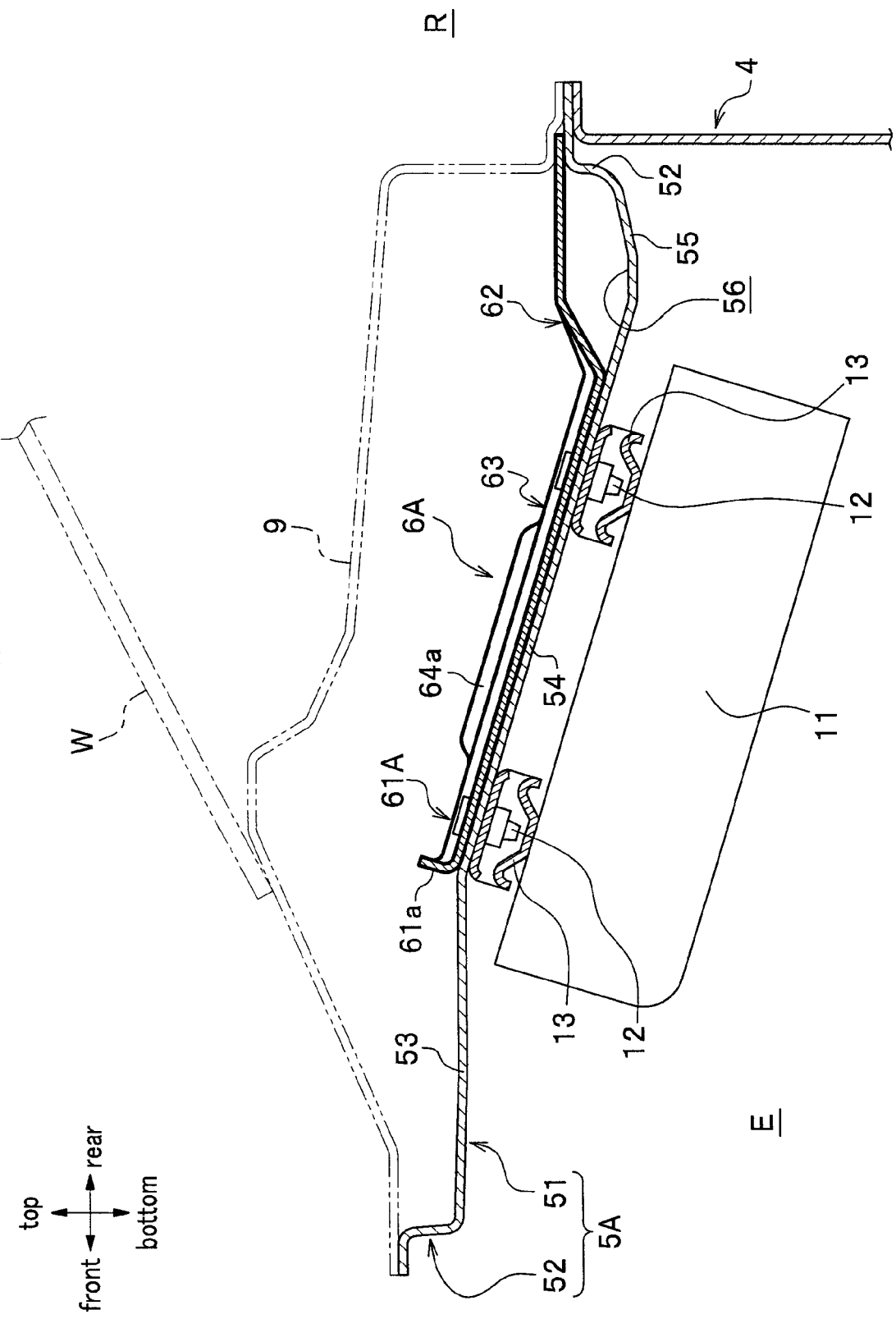
FIG. 6 is a cross section taken along a line F-F in FIG. 5.

As shown in FIG. 5, a vehicle front structure according to the first modified version is essentially the same as the vehicle front structure according to the embodiment shown in FIG. 1, except that the shapes of the right and left end portions of the first transversal element of the stiffener according to the first modified version are different from those of the embodiment above, and the shapes of the upper dashboard that correspond to the shapes of the right and left end portions of the first transversal element of the stiffener according to the first modified version are different from those of the embodiment above. (Therefore, as shown in FIG. 6, the structure of a center portion of the upper dashboard and the stiffener is the same as that in FIG. 2.)

In both right and left end portions of the inclined portion 54 of an upper dashboard 5A, instead of the through-holes 54a, 54a of the embodiment above, cutout portions 57,57 (see FIG. 5) for exposing the upper faces of the respective damper housings 3,3 are formed.

Both end portions 61Ab, 61Ac of a first transversal element 61A are fixed by welding to the upper portions of the damper housings 3,3 exposed from the cutout portion 57 of the upper dashboard 5A.

Figure 7:
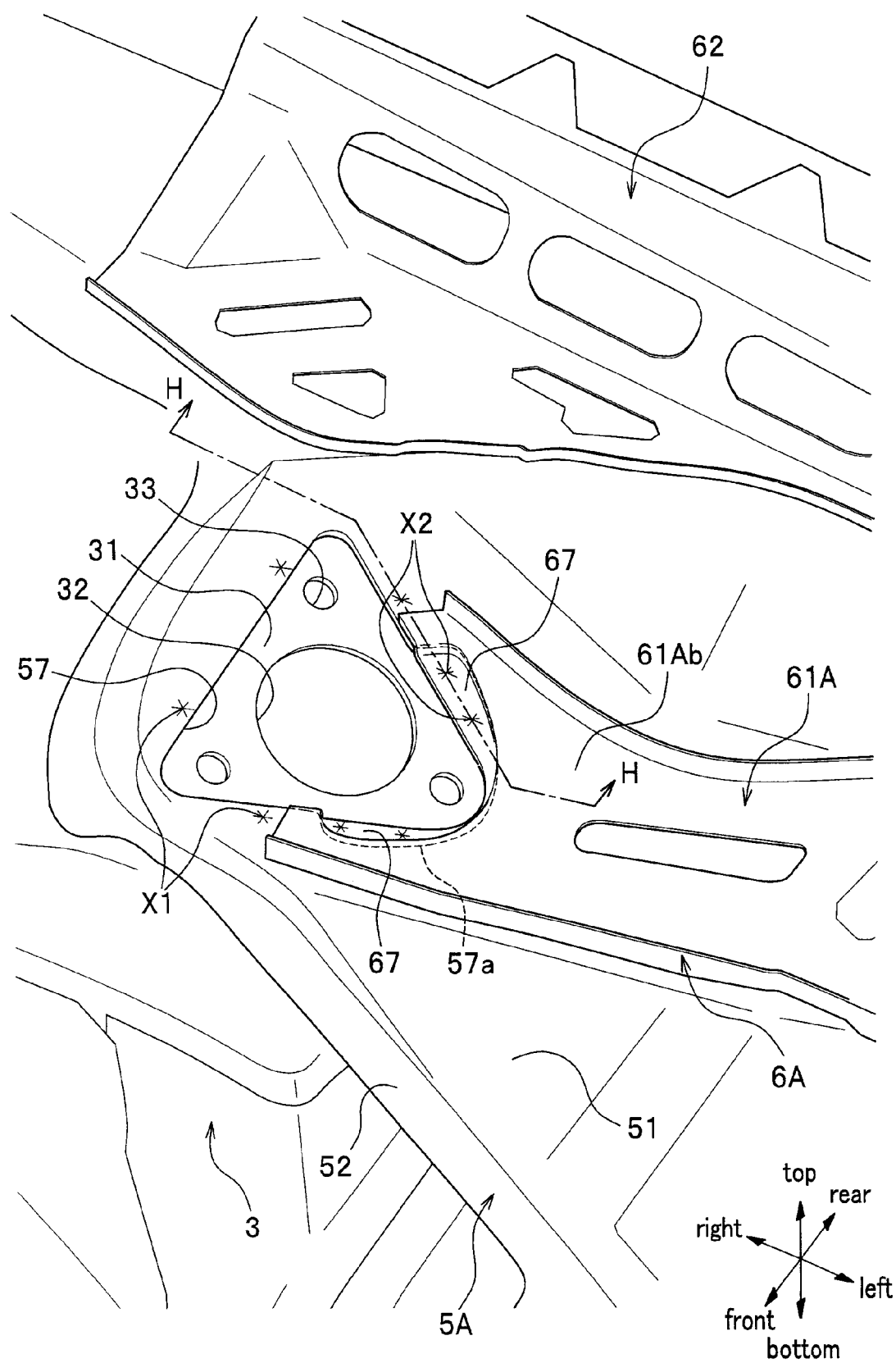
FIG. 7 is an enlarged perspective view of a portion G in FIG. 5.
Figure 8:
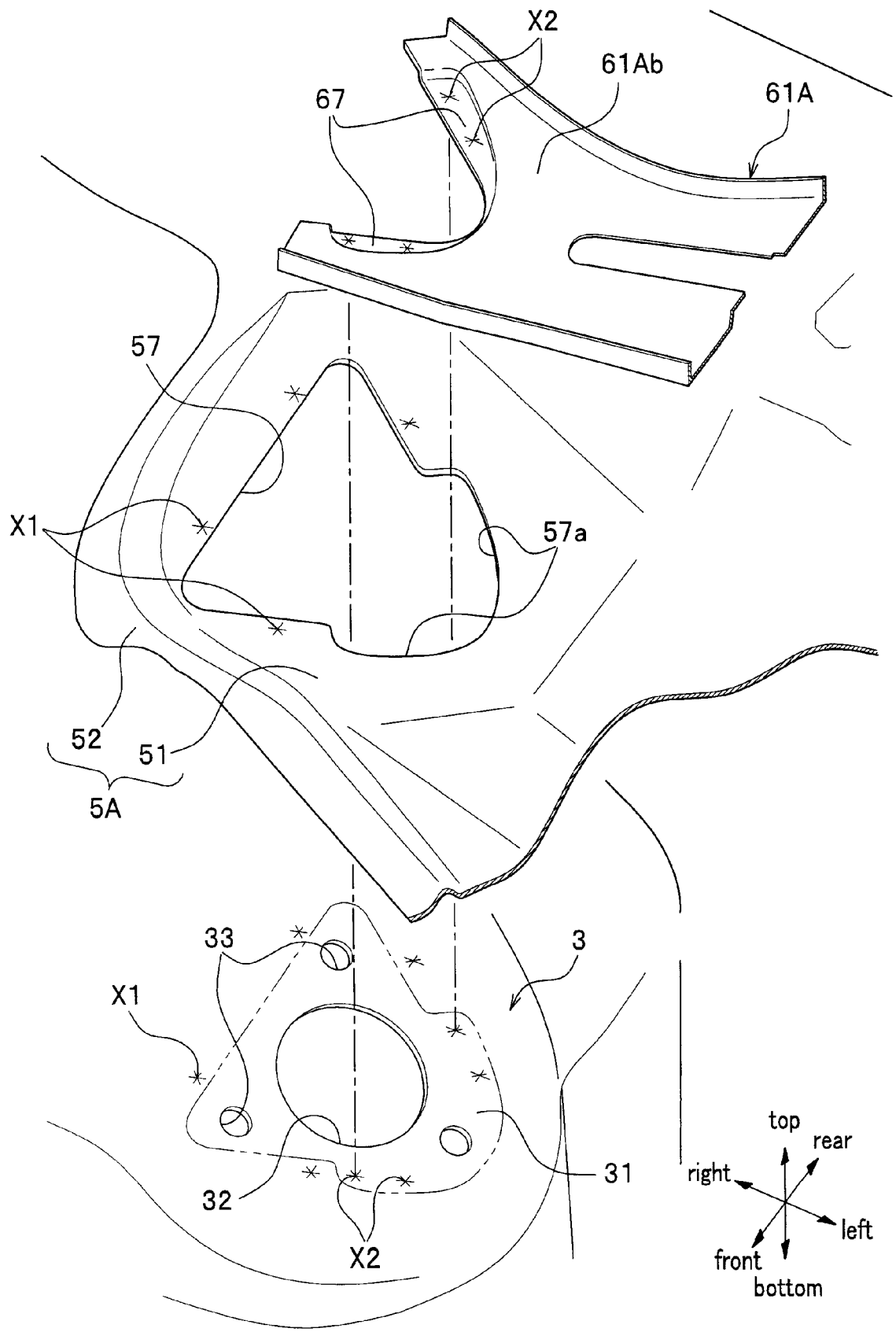
FIG. 8 is an exploded perspective view of the portion G of FIG. 5.
Figure 9:
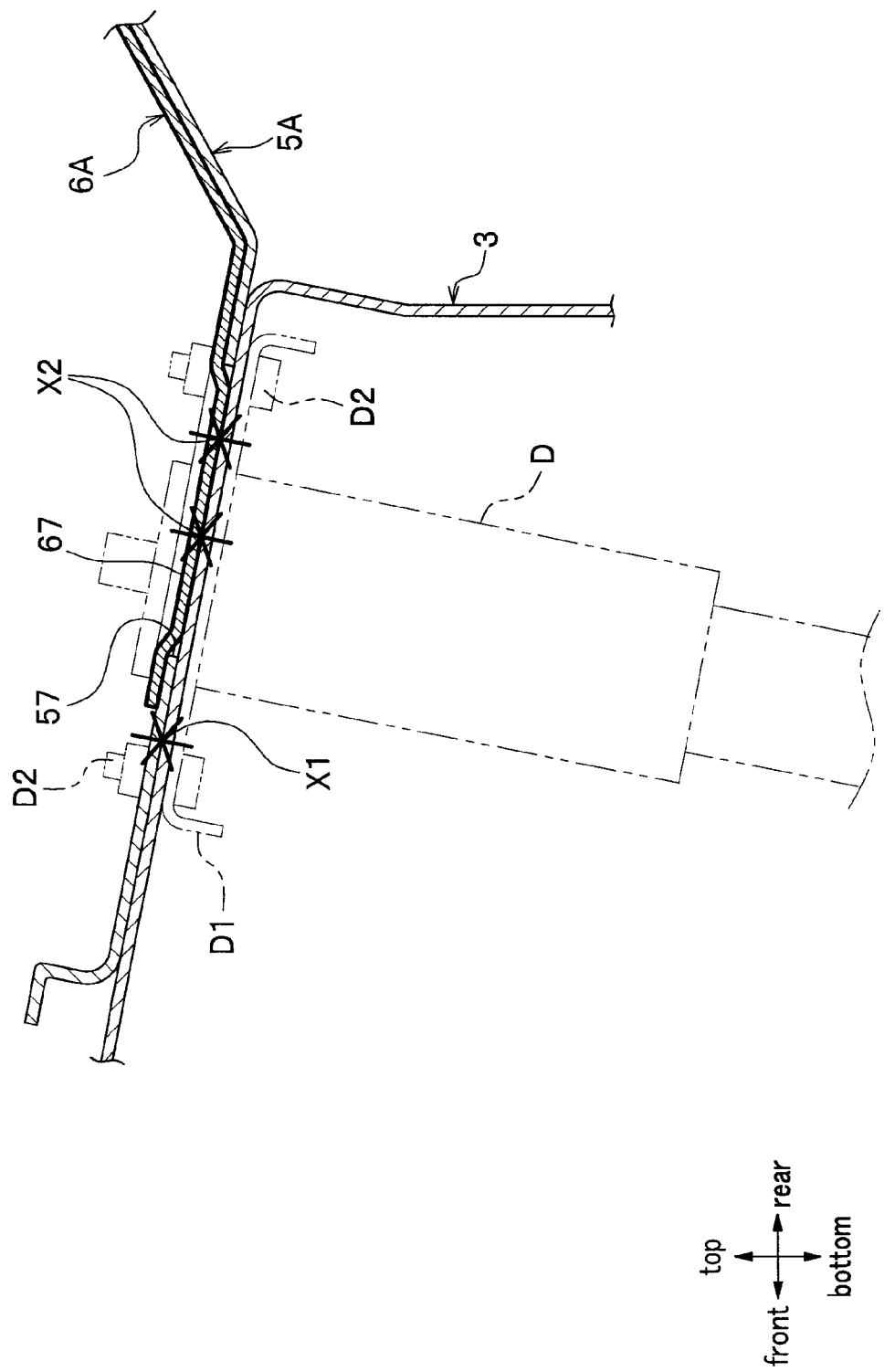
FIG. 9 is a cross section taken along a line H-H in FIG. 7.

As shown in FIGS. 7 to 9, in a portion of the bottom wall 51 of the upper dashboard 5A, which portion is mounted on the upper face of the damper housing 3, the cutout portion 57 in an approximate triangle shape as a planar view is formed. With respect to each cutout portion 57A, a periphery on a stiffener 6A side (an inner side of the vehicle body) is widened to form a widened portion 57a. At welding points X1 which are positioned around the cutout portion 57, the upper dashboard 5A is joined to the upper face of the damper housing 3 by, for example, spot welding.

It should be noted that, in a portion of the upper face of the damper housing 3 that is exposed through the cutout portion 57 (hereinbelow, this portion may also be referred to as "exposed portion 31"), a fitting hole 32 for fitting a head of the damper D (see FIG. 9) therein and bolt holes 33 for inserting the bolt D2 for fixing the damper D (see FIG. 9) are formed.

As shown in FIGS. 7 to 9, in the right end portion 61Ab in a shape of Y as a planar view, an abutting portion 67 is formed in a periphery portion facing the cutout portion 57, which is configured to be brought into close surface-to-surface contact with the exposed portion 31 of the damper housing 3, through the cutout portion 57.

The abutting portion 67 is formed in such a manner that the shape thereof becomes approximately the same as that of the widened portion 57a. The abutting portion 67 is formed in such a manner that the stiffener 6A has a projection on a lower face side, and a recess on an upper face side. A protrusion depth of the abutting portion 67 on the lower face side of the stiffener 6A is approximately the same as a thickness of the upper dashboard 5 (see FIG. 9).

The right end portion 61Ab of the first transversal element 61A is directly welded to the exposed portion 31 of the damper housing 3 by, for example, spot welding, at welding points X2 in the abutting portion 67.

With respect to the left end portion 61Ac of the first transversal element 61A, the structure is substantially the same as that of the right end portion 61Ab (except that they are bilaterally-symmetric), and thus the detailed description is omitted.

As shown in FIG. 9, the damper D is disposed in the damper housing 3. The head of the damper D fits in the fitting hole 32 formed in the exposed portion 31 of the damper housing 3. In addition, on an upper portion of the damper D, the bracket D1 for damper installation is provided. The damper D is secured by engaging the nut with the bolt D2 that penetrates the bracket D1 and the damper housing 3.

Next, effects of the vehicle front structure according to the first modified version, other than the effects of the above-mentioned embodiment, will be described.

According to the first modified version, the cutout portion 57 for exposing the upper face of the damper housing 3 is formed in the upper dashboard 5A, and the end portions of the stiffener 6A (specifically, the right end portion 61Ab and the left end portion 61Ac of the first transversal element 61A) are welded to the respective exposed portions 31 of the damper housing 3 exposed from the cutout portions 57, to thereby directly join the damper housing 3 and the stiffener A6 to each other. Accordingly, the number of overlapped plates becomes smaller (as a portion of the upper dashboard 5A is cut out), and the damper housing 3 and the stiffener 6A are surely welded to each other, leading to efficient load transfer from the damper housing 3 to the stiffener 6A. In addition, the upper dashboard 5A is welded to the damper housing 3, at the positions around the cutout portion 57. As a result, by the upper dashboard 5A and the stiffener 6A, the right and left damper housings 3,3 are firmly connected to each other, leading to reinforcement of rigidity of the damper housing 3. In other words, joining structure can be simplified without using excessive multiple welding.

Furthermore, according to the first modified version, in each of the right end portion 61Ab and the left end portion 61Ac of the first transversal element 61A, the abutting portion 67 is formed which is configured to be brought into contact with the exposed portion 31 of the damper housing 3 through a space of the cutout portion 57, and the damper housing 3 and the stiffener 6A are welded to each other at the abutting portion 67, and thus they are surely and easily joined to each other.

The first modified version of the present invention has been described above. However, the present invention is not limited to the first modified version described above, and it is a matter of course that the above modified version may be further properly modified.

For example, in the first modified version, the cutout portion 57 is formed in the right and left end portions (both ends) of the upper dashboard 5A. Alternatively, the cutout portion 57 may be formed in one of the end portions of the upper dashboard 5A. With this structure, at one of the end portions, the damper housing 3 and the stiffener 6A are firmly and surely joined to each other.

In this case, the other end portion of the stiffener 6A is joined indirectly to the upper face of the damper housing 3, for example, through the upper dashboard 5A.

Also in the first modified version, the cutout portion 57 is formed as a through-hole. However, the cutout portion 57 is not limited to the through-hole, and for example, a portion of an edge of the upper dashboard 5A may be cut out.

It should be noted that in the first modified version, the above-mentioned configuration is applied to the stiffener 6A formed of the first transversal element 61A, the second transversal element 62 and a plurality of the longitudinal elements 63. Alternatively, the configuration may be applied to the stiffener having a different shape.

In the first modified version, the heavy load 11 is fixedly suspended from the upper dashboard 5A. However, the present invention is not limited to this manner of fixing, and the heavy load 11 may be fixed not by suspension.

<Second Modified Version>

A second modified version according to the present invention will be described in detail with reference to FIGS. 10 to 14. In the following descriptions, components which are the same as those illustrated in the embodiment above are designated with the same reference characters, and thus a duplicate description is omitted. Components which correspond (equivalent or similar) to those illustrated in the embodiment above are designated with the same reference characters, along with the character "B", and detailed description is made only when necessary.

Figure 10:
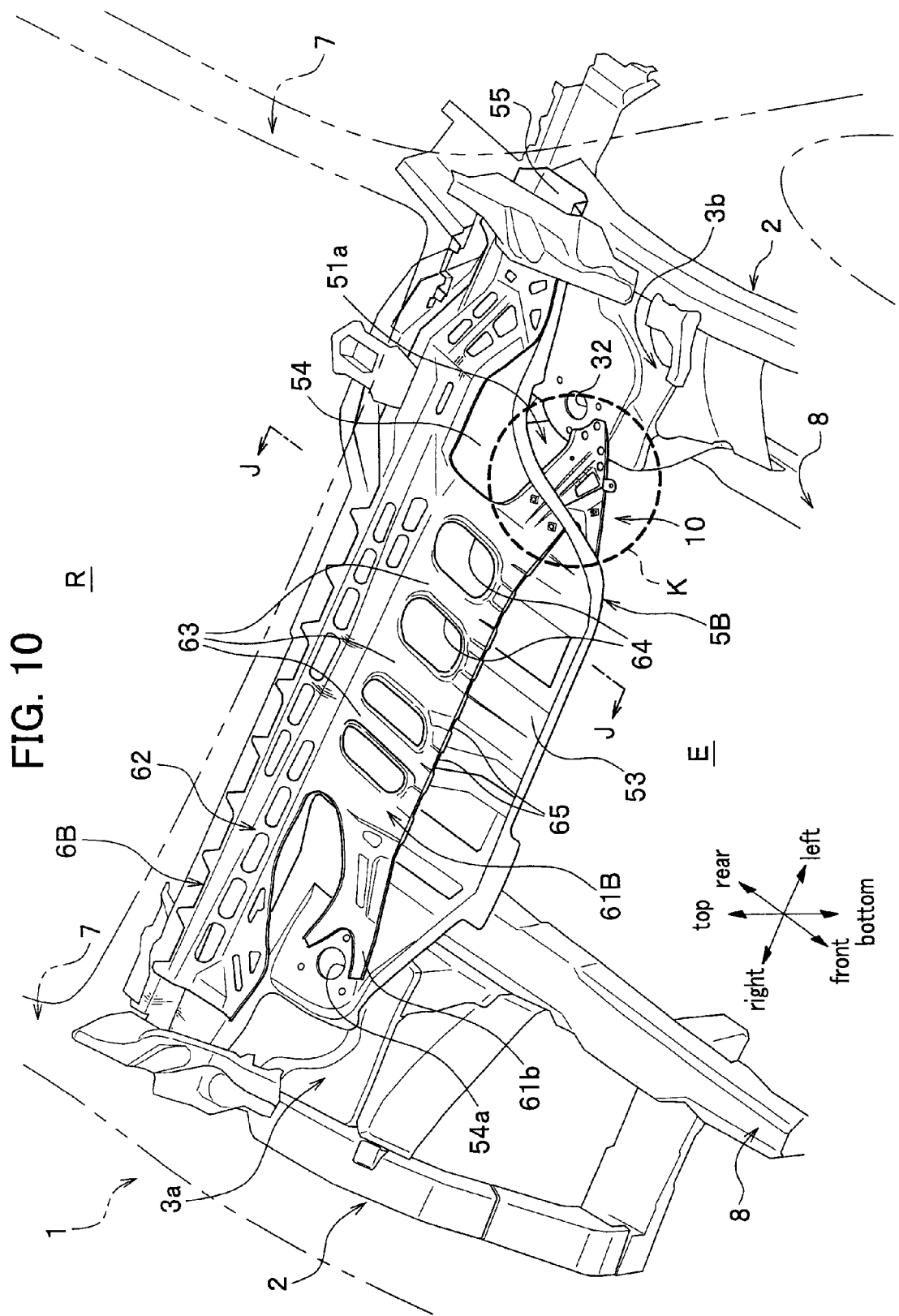
FIG. 10 is a perspective view showing a front side of a vehicle body having a front structure according to a second modified version of an embodiment of the present invention.
Figure 11:
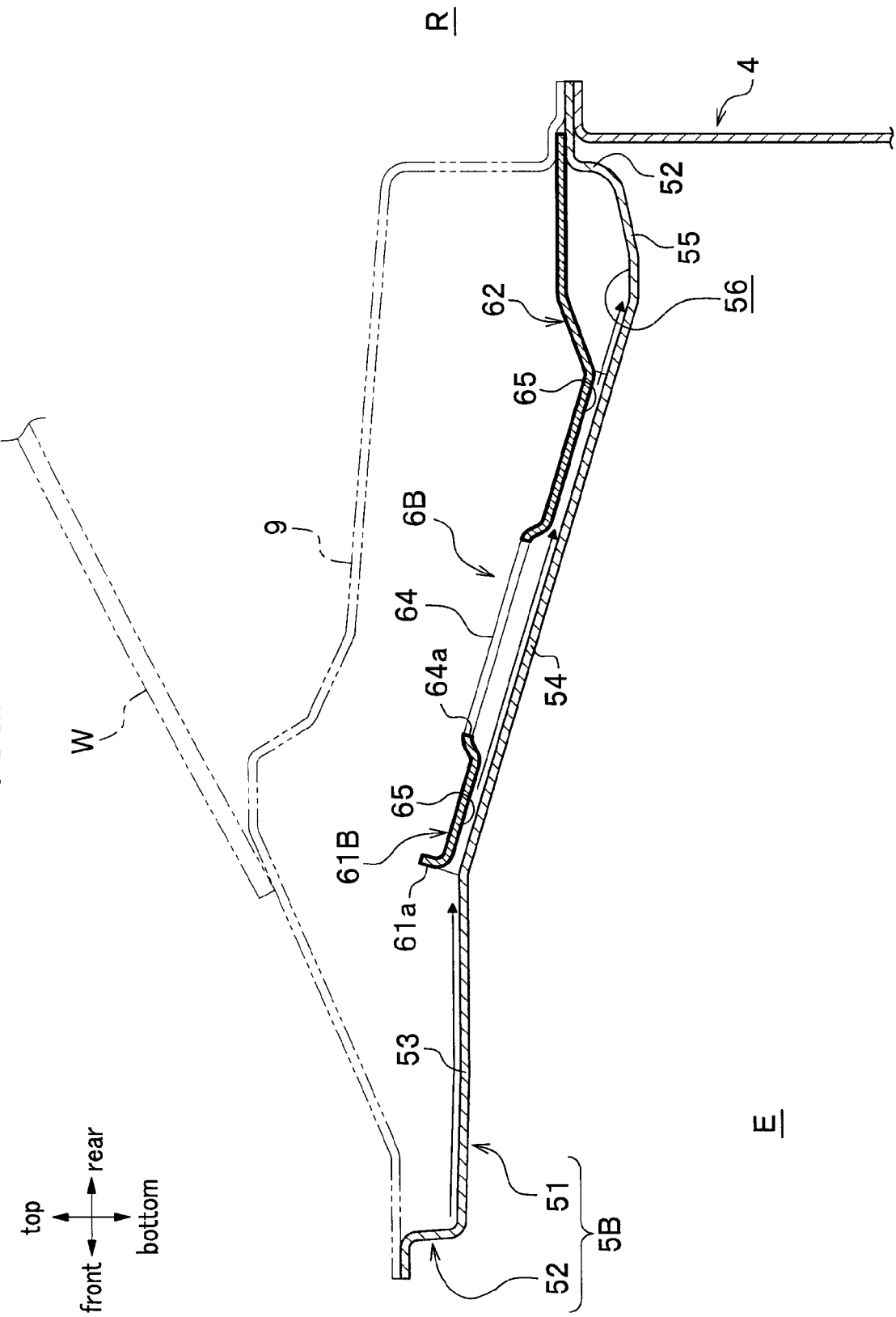
FIG. 11 is a cross section taken along a line J-J in FIG. 10.

As shown in FIG. 10, a vehicle front structure according to the second modified version is essentially the same as the vehicle front structure according to the embodiment shown in FIG. 1, except that the shape of the left end portion of the first transversal element of the stiffener according to the second modified version is different from that of the embodiment above, and the shape of the upper dashboard that corresponds to the shape of the left end portion of the first transversal element of the stiffener according to the second modified version are different from those of the embodiment above. (Therefore, as shown in FIG. 11, the structure of a center portion of the upper dashboard and the stiffener is the same as that in FIG. 4.) It should be noted that in the second modified version, an explanation is made by illustrating a stiffener having a modified portion on the left end, but the modified portion may be formed on the right end or both ends. In the description of the second modified version, the damper housings 3,3 are renumbered as 3a and 3b, in order to distinguish the right damper housing and the left damper housing.

An upper dashboard 5B extends frontward relative to the vehicle 1 from the upper end portion of the lower dashboard 4, and one of the right and left end portions of a front side portion of the upper dashboard 5B (right end in FIG. 10) is joined to the upper portion of one of the damper housings (damper housing 3a in FIG. 10) disposed on a right side and a left side. On the other hand, right and left end portions of a rear side portion of the upper dashboard 5B are joined to the respective upper members 2,2.

The upper dashboard 5B has a cutout portion 51a on a side of the other damper housing (damper housing 3b in FIG. 10). To the upper portion of the upper dashboard 5B, a stiffener 6B is fixedly installed in order to reinforce the upper dashboard 5B. One of right and left end portions of the stiffener 6B (right end in FIG. 10) is joined to the upper portion of one of the damper housings (damper housing 3a in FIG. 10). These members are joined to each other by, for example, spot welding and fillet welding. At the cutout portion 51a, the other from the right and left end portions of the stiffener 6B (left end in FIG. 10) is connected to the upper portion of the other damper housing (damper housing 3b in FIG. 10) through a load transfer member 10.

In an end portion of the inclined portion 54 on a damper housing 3a side, the through-hole 54a (see FIG. 10) for exposing the damper head is formed. In an end portion (the bottom wall 51) of the upper dashboard 5B on a damper housing 3b side (cutout portion 51a side), a recessed portion 58 (see FIG. 13) is formed. To the upper face of the recessed portion 58, the stiffener 6B is joined by a bolt or the like, while to a lower face of the recessed portion 58, the load transfer member 10 is joined by a bolt or the like. The upper dashboard 5B is formed by, for example, press molding.

On a damper housing side (damper housing 3a side in FIG. 10), a first transversal element 61B has the end portion 61b in a shape of Y as a planar view, which is joined to the upper face of the upper dashboard 5B without being brought into contact with the head or the fixing bolt D2 (not shown) of the damper D protruding from the through-hole 54a.

Figure 12:
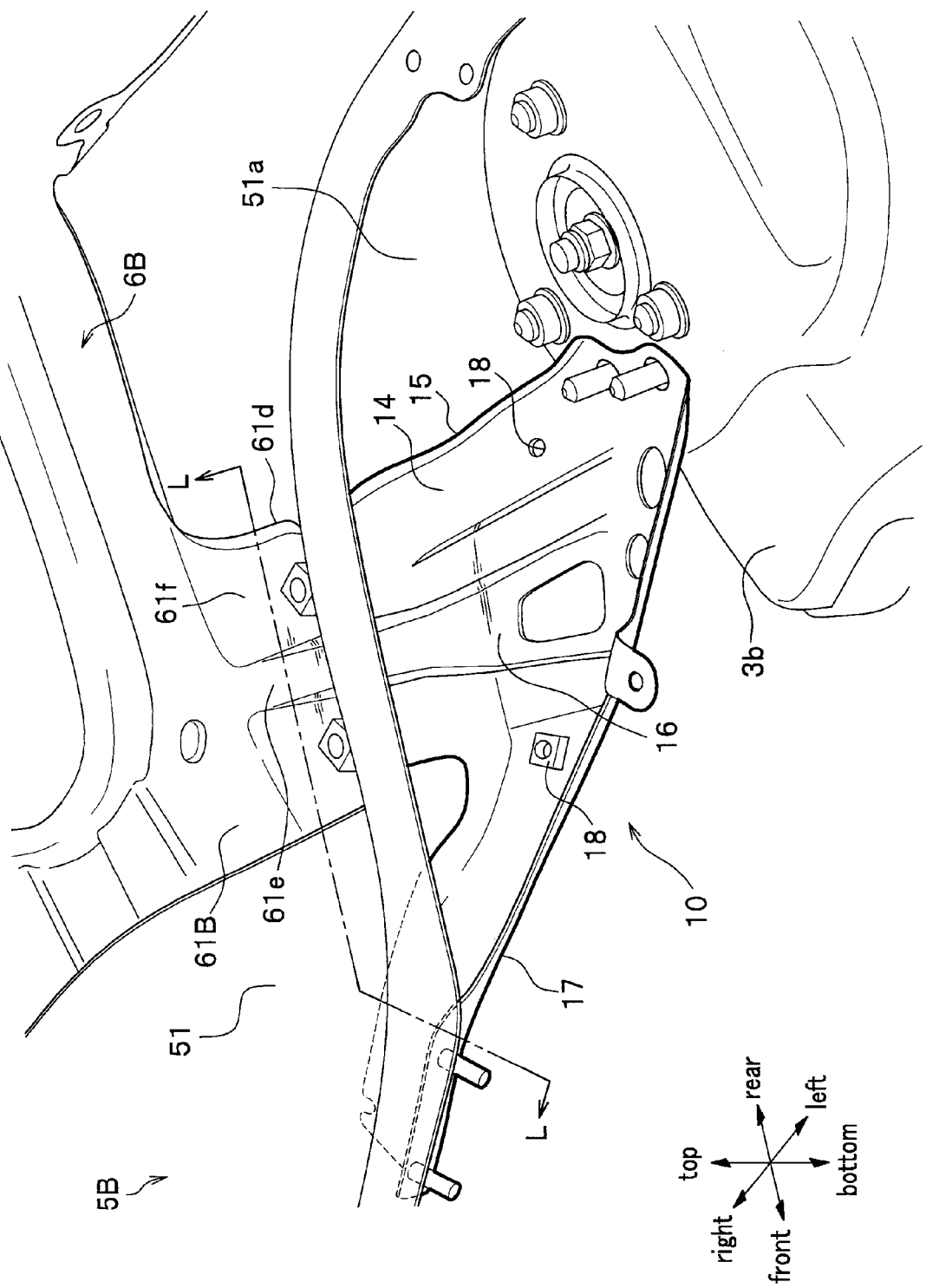
FIG. 12 is an enlarged perspective view of a portion K in FIG. 10.
Figure 13:
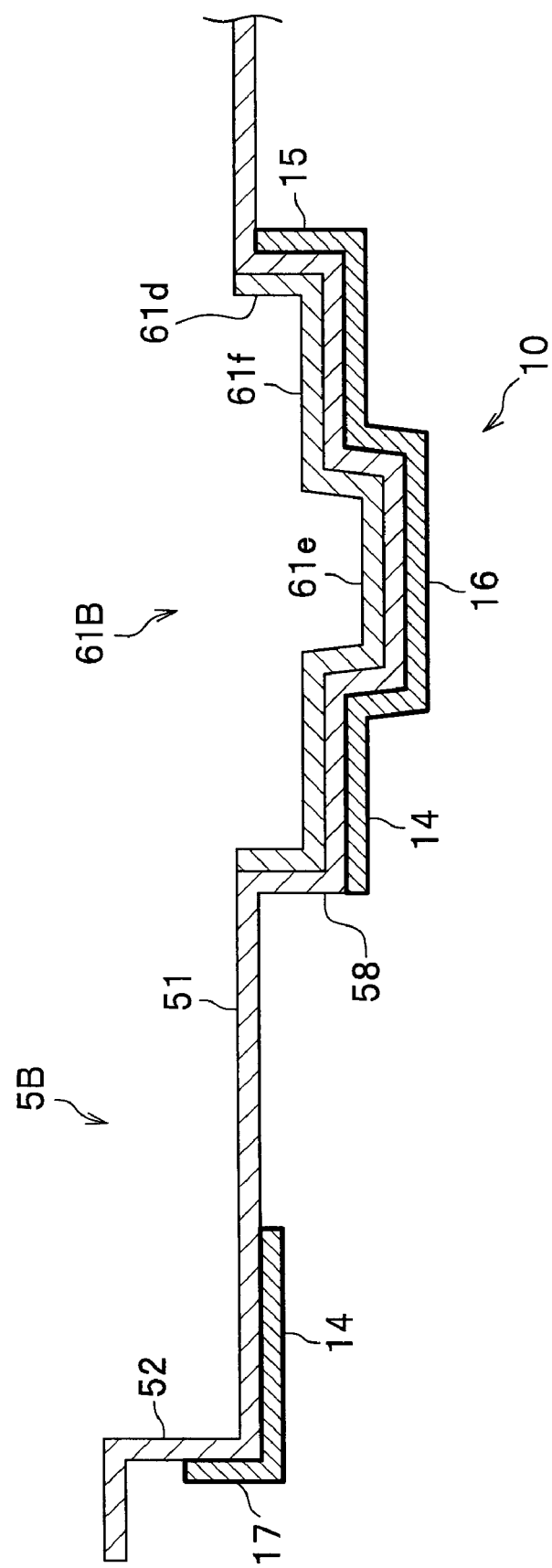
FIG. 13 is a cross section taken along a line L-L in FIG. 12.

As shown in FIGS. 12 and 13, on a damper housing 3b side, the first transversal element 61B is fixed to the upper face of the upper dashboard 5B (bottom wall 51), and at the cutout portion 51a of the upper dashboard 5B, connected to the upper portion of the damper housing 3b through the load transfer member 10. In order to join the first transversal element 61B to the load transfer member 10 through the upper dashboard 5B (the recessed portion 58 of the bottom wall 51), there are provided a flange 61d standing upright relative to a bottom wall 61f, formed in a rear end portion of the bottom wall 61f, and a bead 61e protruding downward relative to the bottom wall 61f, formed at nearly a middle portion of the bottom wall 61f.

Figure 14:
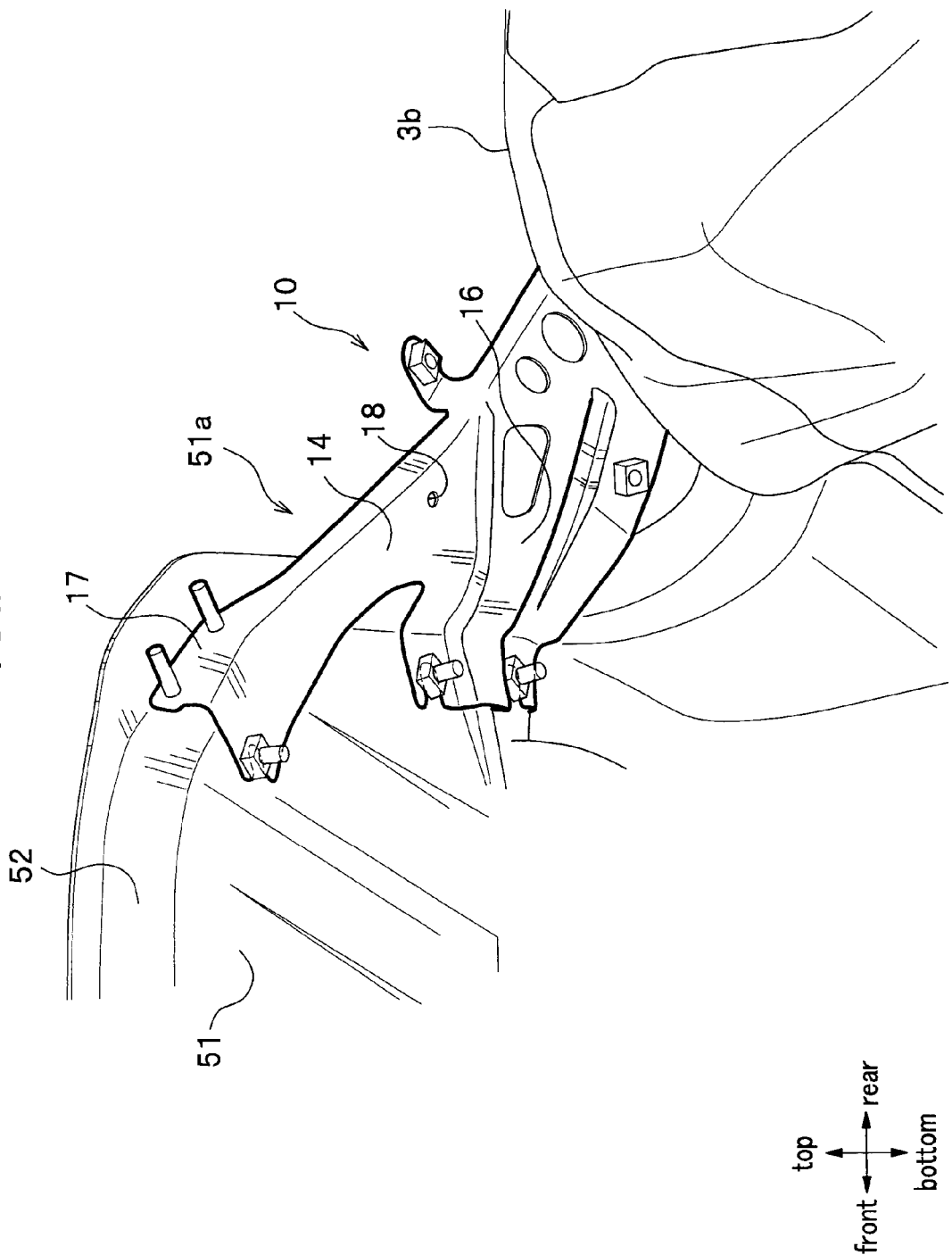
FIG. 14 is a perspective view of a load transfer member of FIG. 12 seen from a bottom side of an upper dashboard.

Referring to FIGS. 12 to 14 (see FIG. 10 where appropriate), the load transfer member 10 is a plate-like member made of steel, bridging the damper housing 3b and the upper dashboard 5B. At one end portion (right end in FIG. 12), the load transfer member 10 is joined to the transversal element 61B through the upper dashboard 5B (the bottom wall 51) using a bolt, and in the other end (left end in FIG. 12), joined to a bolt protruding from an upper portion of the damper housing 3b with a nut.

The load transfer member 10 includes: a bottom wall 14; a flange 15 formed in a rear end portion of the bottom wall 14; a bead 16 formed in nearly a middle portion of the bottom wall 14; and a flange 17 formed in a front end portion of the bottom wall 14. In the bottom wall 14, installation means 18,18 (in FIGS. 12 and 14, holes with a nut fitted therein) are formed for installing brake-parts or the like. The load transfer member 10 is integrally formed by, for example, press molding of a steel plate using a specific die.

The flange 15 stands nearly vertically relative to the bottom wall 14, and is joined to the flange 61d of the transversal element 61B through the upper dashboard 5B (the recessed portion 58 of the bottom wall 51). With this structure, a shape of the flange formed in the rear end portion of the load transfer member 10 is configured to follow a shape of the flange formed in a rear end portion of the transversal element 61B, and load transfer effect from the damper housing 3b to the upper dashboard 5B and to the stiffener 6B is improved.

The bead 16 has a U-shaped cross section that protrudes downward from the bottom wall 14, and is joined to the bead 61e of the transversal element 61B through the upper dashboard 5B (the recessed portion 58 of the bottom wall 51). With this structure, a shape of the bead of the load transfer member 10 is configured to follow a shape of the bead of the end portion on a cutout portion 51a side of the transversal element 61B, and load transfer effect from the damper housing 3b to the upper dashboard 5B and to the stiffener 6B is improved.

The flange 17 stands nearly vertically relative to the bottom wall 14, and is joined to the peripheral wall 52 of the upper dashboard 5B. With this structure, a shape of the flange formed in the front end portion of the load transfer member 10 is configured to follow a shape of the flange formed in the front end portion of the upper dashboard 5B, and load transfer effect from the damper housing 3b to the upper dashboard 5B and the stiffener 6B is improved.

In FIG. 10, the explanation is made by illustrating the load transfer member 10 being positioned on the left side in the engine compartment E, but the same applies to the case where the load transfer member 10 is positioned on the right side in the engine compartment E (not shown). In other words, the upper dashboard 5B may have the cutout portion 51a in the right end portion, and at the same time, the left end portion of the load transfer member 10 may be joined to the right end portion of the stiffener 6B (transversal element 61B) through the upper dashboard 5B with bolts, and the right end portion of the load transfer member 10 may be joined to a bolt protruding from the upper portion of the damper housing 3a by a nut.

Next, effects of the vehicle front structure according to the second modified version, other than the effects of the above-mentioned embodiment, will be described.

According to the second modified version, even when brake-parts or the like are installed in the vicinity of the damper housing, the upper dashboard can bridge between the damper housings in such a manner that maintenance can be performed on the brake-parts or the like, and still rigidity and strength of the damper housing is improved.

Specifically, as shown in FIGS. 10, 12 to 14, by providing the cutout portion 51*a* in the lateral end portion of the upper dashboard 5B, a space is secured between the upper dashboard 5B and the upper portion of the damper housing 3*b*, and brake-parts or the like can be installed in the vicinity of the damper housing 3*b* in such a manner that maintenance can be performed.

By providing the load transfer member 10 which is fixed to the upper dashboard 5B in the cutout portion 51*a* and connects the stiffener 6B (having the transversal element 61B joined to the upper portion of the damper housing 3*a*) to the upper portion of the damper housing 3*b*, the damper housings 3*a*,3*b* are connected through the upper dashboard 5B and the stiffener 6B (transversal element 61B). Accordingly, load applied onto the damper housings 3*a*,3*b* is effectively transferred to the upper dashboard 5B and the stiffener 6B (transversal element 61B), resulting in improvement in rigidity and strength of the damper housings 3*a*,3*b*.

Especially with respect to the load transfer member 10, the flange 15 configured to join the transversal element 61B (flange 61*d*) is formed in the rear end portion, the bead 16 configured to join the transversal element 61B (bead 61*e*) is formed in the middle portion, and the flange 17 configured to join the upper dashboard 5B (peripheral wall 52) is formed in the front end portion. With this structure, the shapes of the flanges and the beads are coordinated from the upper dashboard 5B and the stiffener 6B (transversal element 61B) to the load transfer member 10. As a result, load transfer efficiency from the damper housing 3*b* is improved, leading to further improvement of rigidity and strength of the damper housing 3*b*.

The description is made with respect to the vehicle front structure having the cutout portion 51*a* formed in the upper dashboard 5B on the damper housing 3*b* side. Alternatively, the vehicle front structure may have two cutout portions 51*a*, 51*a* (not shown) in the upper dashboard 5B, on the damper housings 3*a*,3*b* sides.

In this case, the upper dashboard 5B and the stiffener 6B (transversal element 61B) are not directly joined to the upper portions of the damper housings 3*a*,3*b* disposed right and left, respectively, but through the load transfer members 10,10 disposed on the cutout portions 51*a*,51*a*. Other structural portions are the same as those of the vehicle front structure described above and a duplicate description is omitted.

The second modified version of the present invention has been described above. However, the present invention is not limited to the second modified version described above, and it is a matter of course that the above modified version may be further properly modified.

For example, in FIGS. 12 to 14, the load transfer member 10 includes the bottom wall 14, the flange 15, the bead 16 and the flange 17. However, the load transfer member 10 may include at least one member selected from the bottom wall 14, the flange 15, the bead 16 and the flange 17 (not shown). In addition, in the description above, the bead 61*e* formed in the transversal element 61B and the bead 16 formed in the load transfer member 10 have the bead having a U-shaped cross section protruding downward. However, they may be a bead having a U-shaped cross section protruding upward (not shown).

What is claimed is:

1. A vehicle front structure comprising:
a lower dashboard;
an upper dashboard frontward extending from an upper end portion of the lower dashboard, both the lower dashboard and the upper dashboard partially defining an engine compartment;
damper housings disposed on a right side and a left side of the engine compartment, with right and left ends of the upper dashboard being joined to the respective damper housings; and
a stiffener extending in a vehicle width direction which is fixed to an upper portion of the upper dashboard,
wherein the stiffener is integrally formed of: a first transversal element connecting an upper portion of the right damper housing and an upper portion of the left damper housing; a second transversal element extending in the vehicle width direction and positioned rearward relative to the first transversal element; and a plurality of longitudinal elements each connecting the first transversal element and the second transversal element,
a cutout portion is formed in the upper dashboard for exposing the damper housing, and
an end portion of the stiffener is welded to the damper housing exposed from the cutout portion.

2. The vehicle front structure according to claim 1, wherein the end portion of the stiffener has an abutting portion configured to be brought into close surface-to-surface contact with the damper housing in a space formed by the cutout portion.

3. The vehicle front structure according to claim 1, wherein the cutout portion is a through-hole.

* * * * *